US011182405B2

(12) United States Patent
Sharma et al.

(10) Patent No.: US 11,182,405 B2
(45) Date of Patent: Nov. 23, 2021

(54) HIGH THROUGHPUT CROSS DATABASE TABLE SYNCHRONIZATION AND TRANSACTIONAL REPLICATION IN FEDERATED DATABASES

(71) Applicant: SAP SE, Walldorf (DE)

(72) Inventors: Priya Sharma, Pune (IN); Mahendra Chavan, Pune (IN); Kunj Kothari, Pune (IN)

(73) Assignee: SAP SE, Walldorf (DE)

( * ) Notice: Subject to any disclaimer, the term of this patent is extended or adjusted under 35 U.S.C. 154(b) by 96 days.

(21) Appl. No.: 16/373,725

(22) Filed: Apr. 3, 2019

(65) Prior Publication Data

US 2020/0320098 A1 Oct. 8, 2020

(51) Int. Cl.
*G06F 16/27* (2019.01)
*G06F 16/23* (2019.01)
*G06F 16/28* (2019.01)
*G06F 16/22* (2019.01)

(52) U.S. Cl.
CPC ........ *G06F 16/275* (2019.01); *G06F 16/2282* (2019.01); *G06F 16/2379* (2019.01); *G06F 16/273* (2019.01); *G06F 16/282* (2019.01)

(58) Field of Classification Search
CPC .... G06F 16/27; G06F 16/273; G06F 16/2379; G06F 16/2386; G06F 16/217; G06F 16/22–2291; G06F 16/28–289
See application file for complete search history.

(56) References Cited

U.S. PATENT DOCUMENTS

| | | | | |
|---|---|---|---|---|
| 6,401,104 B1* | 6/2002 | LaRue | ................. | G06F 16/273 |
| 7,082,446 B1* | 7/2006 | Bottomley | ............ | G06F 16/273 |
| | | | | 707/610 |
| 2002/0133507 A1* | 9/2002 | Holenstein | .......... | G06F 11/2064 |
| 2015/0154271 A1* | 6/2015 | Iwasaki | ................. | G06F 16/275 |
| | | | | 707/618 |
| 2016/0092510 A1* | 3/2016 | Samantaray | ...... | G06F 16/24542 |
| | | | | 707/718 |
| 2016/0147859 A1* | 5/2016 | Lee | ..................... | G06F 11/1469 |
| | | | | 707/615 |

* cited by examiner

*Primary Examiner* — Robert W Beausoliel, Jr.
*Assistant Examiner* — Nirav K Khakhar
(74) *Attorney, Agent, or Firm* — Sterne, Kessler, Goldstein & Fox P.L.L.C.

(57) ABSTRACT

Disclosed herein are system, method, and computer program product embodiments for providing a lock-free parallel log replay and synchronization scheme to support asynchronous table replication. By synchronizing a replica table with the server-side data and conducting subsequent updates using transaction logs via a replayer, locking of tables may be avoided. A consistent transactional state may be maintained by employing a replayer to mark the table as enabled instead of a synchronizer. The replayer may also deduce transitive closures among transactions and replay the transactions in parallel based on the deduced transitive closures to optimize playback. These techniques provide enhanced data availability and minimize database blocking and deadlocking while improving query performance.

20 Claims, 5 Drawing Sheets

HIGH THROUGHPUT CROSS DATABASE TABLE SYNCHRONIZATION AND TRANSACTIONAL REPLICATION IN FEDERATED DATABASES

BACKGROUND

Database systems traditionally stored data on disk. While disk-based data storage is relatively cost-effective, storing data in memory may provide significant performance gains, with the tradeoff of being more expensive. Given the two disparate storage methodologies, database systems may employ dynamic tiering allowing organizations to harness a hybrid of the two approaches and optimize storage solutions within their database systems to particular data requirements.

Database systems may provide replication services to replicate data from the data storage location to replica tables on a different server or on a client. By accessing the replicated data, clients may experience improved performance, obviating any need to interact with the remote data storage location, and ultimately improving the usability of software applications.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
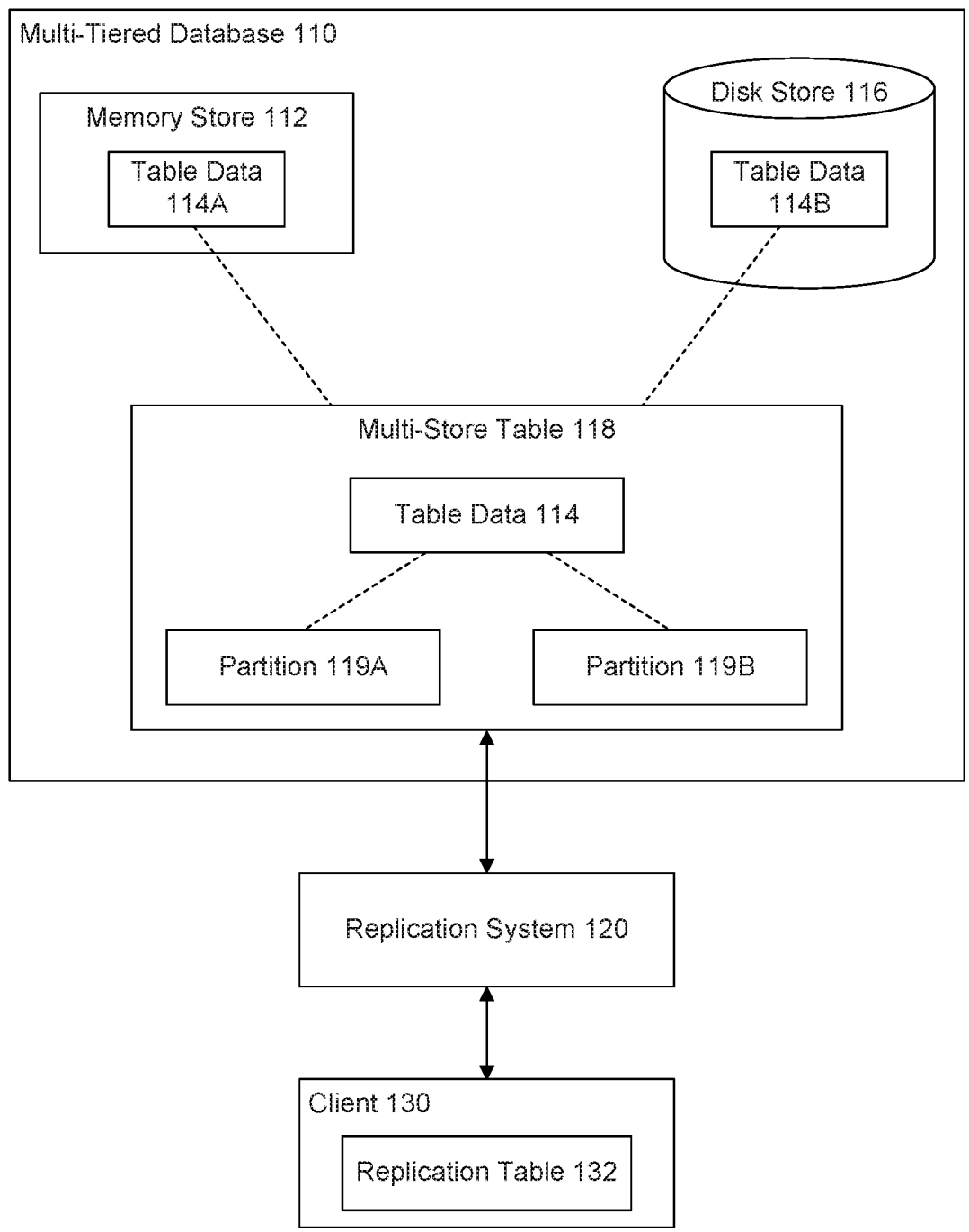
FIG. 1 is a block diagram of an environment including a multi-tiered database and a replication system, according to some embodiments.

Provided herein are system, apparatus, device, method and/or computer program product embodiments, and/or combinations and sub-combinations thereof, for providing a lock-free parallel log replay and synchronization scheme to support asynchronous table replication.

Hardware advances have given rise to modern in-memory database systems. By allowing data to persist within memory, a database management system may eliminate traditional performance bottlenecks inherent in a disk-storage database, e.g., disk input/output, thereby reducing seek time and improving performance. Thus, an in-memory database may be faster than a disk-storage-based database and a valuable tool for software applications where response time is critical. However, in an in-memory database, memory bandwidth and access latency may emerge as the predominant performance bottlenecks and storage costs may increase as compared to disk-based storage systems.

A database management system may apply a dynamic tiering approach, i.e., a hybrid methodology, where data may be stored in both/either memory and/or on disk. In such a system, data administrators may choose memory-based storage for "hot" data and disk-based storage for "warm" data. "Hot" data may be high-availability data or frequently used data and may require faster access for reads, writes, or updates, relative to data stored on disk. "Warm" data may be accessed less frequently than "hot" data and may have relaxed performance constraints.

A table stored in disk-based storage may be referred to in this disclosure as an "extended table" or a "dynamic tiering disk table." Some tables may be identified as a "multi-store table," where a partition of the table data resides in disk-based storage and a partition of the table data resides in memory. Data administrators may configure tables to be extended tables and multi-store tables within the database management system. An in-memory database system may store data in columnar fashion in memory by default.

Modern database systems may also provide data replication services to mirror data and improve performance. Data replication may involve copying data from a database on one server to another database on a different server or client. In an embodiment, replication services may replicate data from in-memory database tables into extended tables. A database system may provide asynchronous table replication through which the replica table may be refreshed with changes made to the source table periodically, for instance, every minute or other configurable number of seconds.

However, legacy replication solutions placed database locks on tables during the replication process to ensure data integrity. Thus, competing queries could not access the tables while replication occurred. While effective in ensuring data integrity, locking the table in this fashion may lead to query performance degradation, deadlocking, and blocking and can adversely impact data availability. These tradeoffs may be unacceptable in a high-availability system employing dynamic tiering.

Accordingly, a need exists to provide a lock-free parallel log replay and synchronization scheme to support asynchronous table replication. By supporting asynchronous table replication into a dynamic tiering, query performance may be improved by harnessing the dynamic tiering replica to allow the dynamic tiering engine to process a query that implicates in-memory data and extend table data.

FIG. 1 is a block diagram of environment 100 including a multi-tiered database and a replication system, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Environment 100 may include multi-tiered database 110, memory store 112, table data 114, disk store 116, multi-store table 118, partition 119, replication system 120, client 130, and replica table 132.

Multi-tiered database 110 may be a relational, columnar, or other suitable database management system employed by an organization, system, application, etc. for a myriad of purposes. Multi-tiered database 110 may store data in disk, in memory, or using a hybrid, dynamically tiered approach that combines the disk-based and memory-based storage methodologies. Multi-tiered database 110 may transfer data between memory and disk according to changing system requirements, workloads, circumstances, user requests, etc. For example, multi-tiered database 110 may store thousands, millions, or billions of records or more. However, because memory storage may be expensive relative to disk storage, an organization may not want to store all of the records in memory and may select a portion of the records to store on disk.

Memory store 112 may be physical memory, e.g., DRAM, SRAM, EEPROM, EDO, SD-RAM, DDR-SDRAM, RD-RAM, or other form of integrated circuit or other memory store. In some embodiments, memory store 112 may provide sufficient space to load data without using disk-based storage. Data in memory store 112 may be "hot" data, which may be accessed and manipulated more quickly relative to data stored on disk.

Table data 114 may be a table in multi-tiered database 110 that stores information used by an organization, application, or system. In some embodiments, table data 114 may be divided into rows and/or columns. For example, table data 114 may be stored in columnar-fashion to improve reading and writing efficiency, maximize compression, and allow greater amounts of data to be stored in-memory. Table data 114 may reside in memory store 112 or disk store 116 (described below). When table data 114 is spread between disk store 116 and memory store 112, the table may be referred to as a multi-store table. When table data 114 is stored in disk store 116, it may be referred to as an extended table.

Disk store 116 may be disk based storage, e.g., solid state drives, serial ATA, parallel ATA, flash disks, physical storage mediums, etc. Data in disk store 116 may be "warm" data that may be accessed less frequently than "hot" data. Accordingly, "warm" data may have relaxed performance constraints.

Multi-store table 118 may be a table stored across both memory store 112 and disk store 116. Though table data 114 may be systematically stored across different storage devices (memory store 112 and disk store 116), a single query may be executed against multi-store table 118 just as a query could execute against a table with all the data stored in either memory or on disk storage. Multi-store table 118 and/or an extended table may store data in a column-based approach to economize storage and access.

Partitions 119 may partition table data 114 into two or more sections. Partitions 119 may indicate ranges of values from one or more columns of multi-store table 118 used to determine how to divide or table data 114. In an embodiment, multi-tiered database 110 may dynamically shift partitions 119 from memory store 112 to disk store 116, or vice versa, based on a query history, data access patterns, or usage analysis.

Replication system 120 may provide replication services for an organization, allowing the organization to copy data from the source database tables into replica tables. Replication system 120 may provide these services to allow organizations to improve the performance of client applications because allowing the client to store a local copy of the data reduces the amount of reads and writes that may be needed to the server-side data. Replication system 120 may provide these services to promote data redundancy, data mirroring, etc. Replication system 120 is described in further detail below as replication system 200 with reference to FIG. 2.

Client 130 may be a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. Client 130 may be used by a member of a business, organization, or other suitable group using replication system 120 to receive asynchronous data updates from multi-tiered database 110. A user of client 130 may be an individual, entity, user, customer, etc. using data-driven software applications. A user of client 130 may be a human being, but the user may also be an artificial intelligence construct. In an embodiment, client 130 may be another database server used to mirror the data on multi-tiered database 110 to provide redundancy or a locally situated data repository.

Replica table 132 may be copy of a database table in multi-tiered database 110 stored locally on client 130. replica table 132 may be stored entirely on disk or entirely within memory or in a combination of disk and memory. Replica table 132 may receive updates from the source table periodically via replication system 120.

In one embodiment, multi-tiered database 110 may receive a SQL query that indicates in the structured querying language an acceptable time period for which data in the replica table may be read. If the replicable table data accessed by the query was last refreshed by replication system 120 within the acceptable time period, then the SQL query may retrieve data from replica table 132. If the needed table data was refreshed outside of the acceptable time period, then the data may be fetched or retrieved from the source table or replication system 120 may be engaged to bring replica table 132 up to date prior to the execution of the received query.

Figure 2:
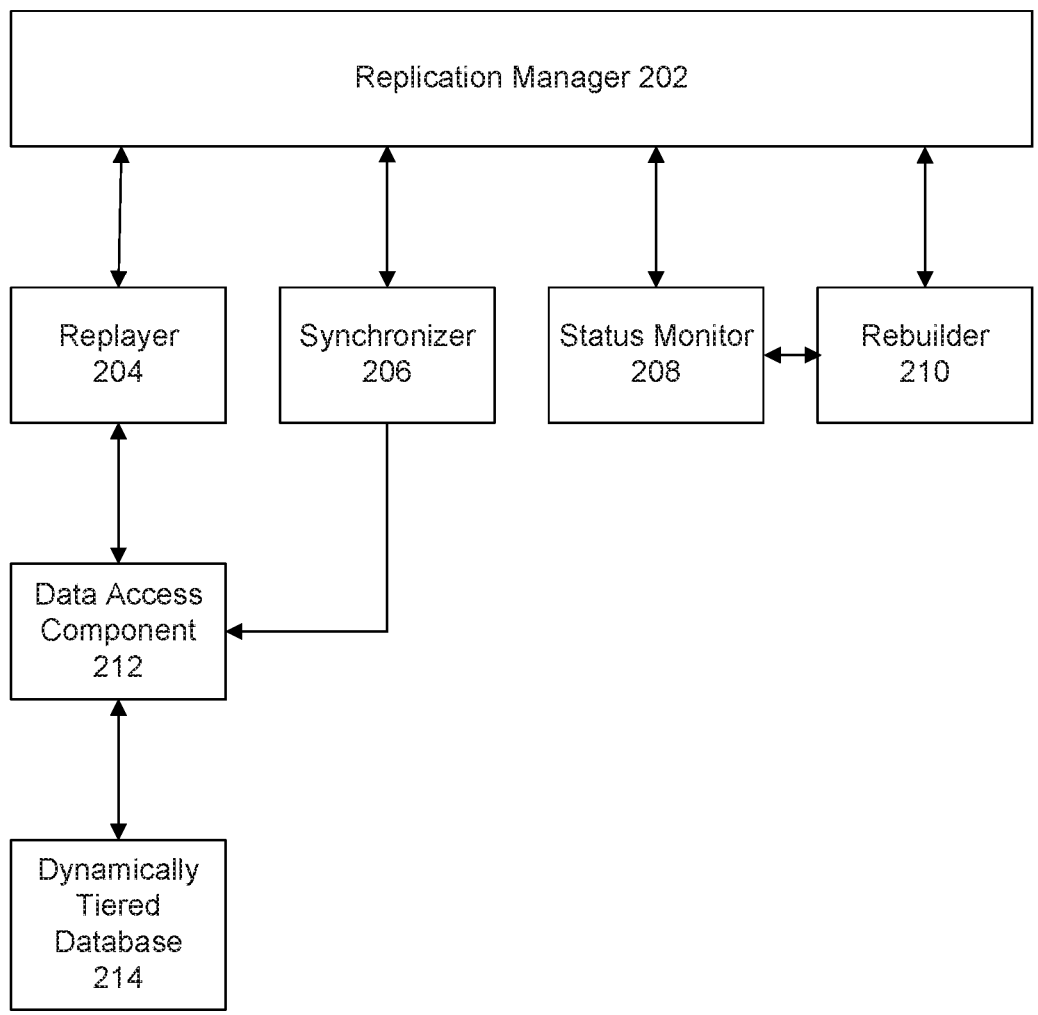
FIG. 2 is a block diagram of a replication system, according to some embodiments.

FIG. 2 is a block diagram illustrating replication system 200, according to some embodiments. Any operation herein may be performed by any type of structure in the diagram, such as a module or dedicated device, in hardware, software, or any combination thereof. Any block in the block diagram of FIG. 2 may be regarded as a module, apparatus, dedicated device, general-purpose processor, engine, state machine, application, functional element, or related technology capable of and configured to perform its corresponding operation(s) described herein. Replication system 200 may include replication manager 202, replayer 204, synchronizer 206, status monitor 208, rebuilder 210, data access component 212, and dynamically tiered database 214.

Replication manager 202 may be an interface between different components in replication system 200. Replication manager 202 may provide abilities to database administrators to determine which tables in multi-tiered database 110 to replicate. Replication manager 202 may provide various configuration options for the replicated tables. Just for example, a database administrator may select to enable replication across all tables in a database through a graphical interface. Or a database administrator may enter a command to enable database replication on a single table, such as an "Alter Table" or "Create Table" command. Replication manager 202 may coordinate the activities of replayer 204, synchronizer 206, status monitor 208, and rebuilder 210 to support asynchronous table replication without locking the source table.

Replication manager 202 may transition replica table 132 through various states. For example, when replica table 132 is created, replica table 132 may be in a "DISABLED" state. When the synchronization process starts (i.e., when replication manager 202 engages synchronizer 206), replica table 132 may move to an "ENABLING" state. If an error occurs during synchronization, replica table 132 may return to the "DISABLED" state. After the synchronization completes, replica table 132 may reach the "ENABLING" state with a special code of "Waiting for Log Replay," which is maintained in a system table stored on disk. If an error occurs, the state is changed to "DISABLED" and the special code is cleared. After a transactional replay is performed by replayer 204, replica table 132 is marked "ENABLED" and the special code is cleared from the system table. Replication manager 202 may employ replayer 204 to mark the table as "ENABLED," as opposed to synchronizer 206, to avoid an inconsistent transactional state, as described in the following example.

An inconsistent transactional state may occur if synchronizer 206 updated the status of replica table 132 in a situation where multiple transactions impacted multiple replica tables. For example, consider a write transaction that executed against tables "T1," "T2," and "T3." In this example, replica tables associated with "T2" and "T3" may have been in an "ENABLED" state while "T1" was in a "DISABLED" state. Synchronization would need to be enabled for "T1" to bring "T1" into an "ENABLED" state. However, at this hypothetical point data from the transaction would be in "T1" (via the synchronization), but "T2" and "T3" would lag behind until replayer 204 processed the transaction logs corresponding to the transaction, and a transactionally consistent view would not be available if a query accessed T1's replica. Hence, replication manager 202 employs replayer 204 to mark the "T1" replica as "ENABLED" only once all transactions are replayed against "T1."

Replayer 204 may periodically execute a replay of transaction logs to bring replica table 132 up to date with a source table.

Given a replay cycle, replayer 204 may identify a set of transactions to be processed from transaction logs in multi-tiered database 110. Replayer 204 may store a number called the record commit timestamp each time that replayer 204 replays a set of transaction logs. The record commit timestamp may indicate the marker in the transaction logs up to which replayer 204 previously replayed. When new logs are generated in the source tables, replayer 204 may retrieve logs having a record commit timestamp that is greater than the saved record commit timestamp for replay. After identifying the set of relevant transactions, replayer 204 may then identify transitive interdependency based on tables updated in the transactions and deduce transitive closures, i.e., groups of transactions based on the updated tables.

Consider the following example, where replayer 204 retrieves the following transactions from the transaction logs:

```
#TX1 updates table T1, T2, T4
#TX2 updates table T2, T3, T4
#TX3 updates table T3, T5, T6
#TX4 updates table T6, T7
#TX5 updates table T8, T9
#TX6 updates table T9, T10
#TX7 updates table T11
#TX8 updates table T12
```

In this example, replayer 204 may deduce the transitive closures: 1) (TX1, TX2, TX3, TX4); 2) (TX5, TX6); 3) (TX7); and 4) (TX8). Replayer 204 may then place the transactions in a given closure into a queue in commit order. Multiple queues may exist to process the different transitive closures, with a particular transitive closure treated as a single internal transaction. Sets of tables within a given transitive closure may be replayed in parallel using sub transactions, with a commit happening once all transactions in the transitive closure are replayed. Replayer 204 may apply load balancing to the different queues. This strategy ensures that no concurrent manipulative operations occur on a given table at any time, and is suited for dynamic tiering systems.

Synchronizer 206 may perform a user-driven or automated activity that identifies the difference between a source table and an associated replica table. Synchronizer 206 may update the replica table according to the identified differences. In one embodiment, synchronizer 206 may copy all of the data from the source table into the replica table. Synchronizer 206 may operate system-wide, in parallel and synchronously for all tables holding dynamic tiering replicas or asynchronously for a single table. In one embodiment, synchronizer 206 may be employed immediately upon creation of the replica table to copy an initial version of the source table into replica table 132 preparing the table to begin log-based updates via replayer 204. Synchronizer 206 may leave the source tables and replica tables unlocked during the synchronization process. Accordingly, log generation may continue to occur during the synchronization process. In an embodiment, the only manipulative operations (e.g., updates, inserts, deletes) performable on replica tables such as replica table 132 may be performed by synchronizer 206 and replayer 204.

Replication manager 202 may achieve serialized execution between synchronizer 206 and replayer 204 by aborting replayer 204 any time synchronizer 206 and replayer 204 concurrently attempt to modify a set of tables. Favoring synchronizer 206 over replayer 204 avoids the inconsistent transactional state described above.

Status monitor 208 may maintain crucial information about replica tables, e.g., the status of the replica table(s) and associated special codes. The information in status monitor 208 may also persist in system tables stored in disk-based storage.

Rebuilder 210 may rebuild the information about replica tables stored in status monitor 208. For example, after a database restart, rebuilder 210 may retrieve the status information from the system tables and update status monitor 208.

Data access component 212 may provide the architecture to support data delivery between replica table 132 and multi-tiered database 110. Data access component 212 may employ a variety of suitable methods to process and transmit transactional data.

Figure 3:
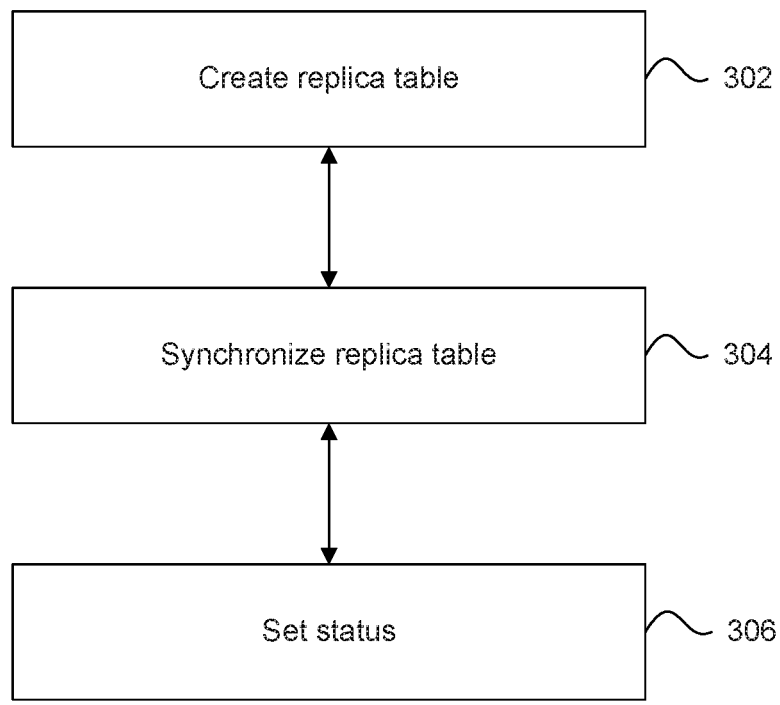
FIG. 3 is a flowchart illustrating a method of initializing a replica table with a multi-tiered database using a synchronizer, according to some embodiments.

FIG. 3 is a flowchart illustrating method 300 of initializing a replica table with a multi-tiered database using a synchronizer. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, replication manager 202 may create a replica table (or tables), such as replica table 132. Replication manager 302 may create the replica table in response to a user command or automated process. Replica table 132 may be created on client 130 and be associated with a source table in multi-tiered database 110. For example, a database administrator or client-side program may enter a "CREATE TABLE" command on client 130 along with appropriate parameters specifying replica configuration information to create replica table 132. When created, replica table 132 may be placed by replication manager 202 into a "DISABLED" state, indicating that replication is currently disabled for replica table 132 (until replica table 132 is brought into an "ENABLED" state, queries may not access or retrieve the data).

In 304, replication manager 202 may engage synchronizer 206 to update the data in replica table 132. In one embodiment, synchronizer 206 may copy all of the data from the source table into replica table 132. In another embodiment, synchronizer 206 may retrieve only a portion of the data based on a time-stamp, row identifier, or other temporal indicator. When the synchronization starts, replication manager 202 may move replica table 132 into an "ENABLING" state.

In 306, replication manager 202 may update the status of replica table 132 based on the result of the synchronization. In one embodiment, replication manager 202 may update the status information in status monitor 208 directly. If an error occurs while synchronizer 206 is updating the data, replication manager 202 may return replica table 132 to the "DISABLED" state. If synchronization completes without an error occurring, replica table 132 may move to the "ENABLING" state with a special code of "Waiting For Log Replay." If an error occurs after the synchronization completes and before the log replay occurs, replication manager may return the state to "DISABLED" and clear the special code.

Figure 4:
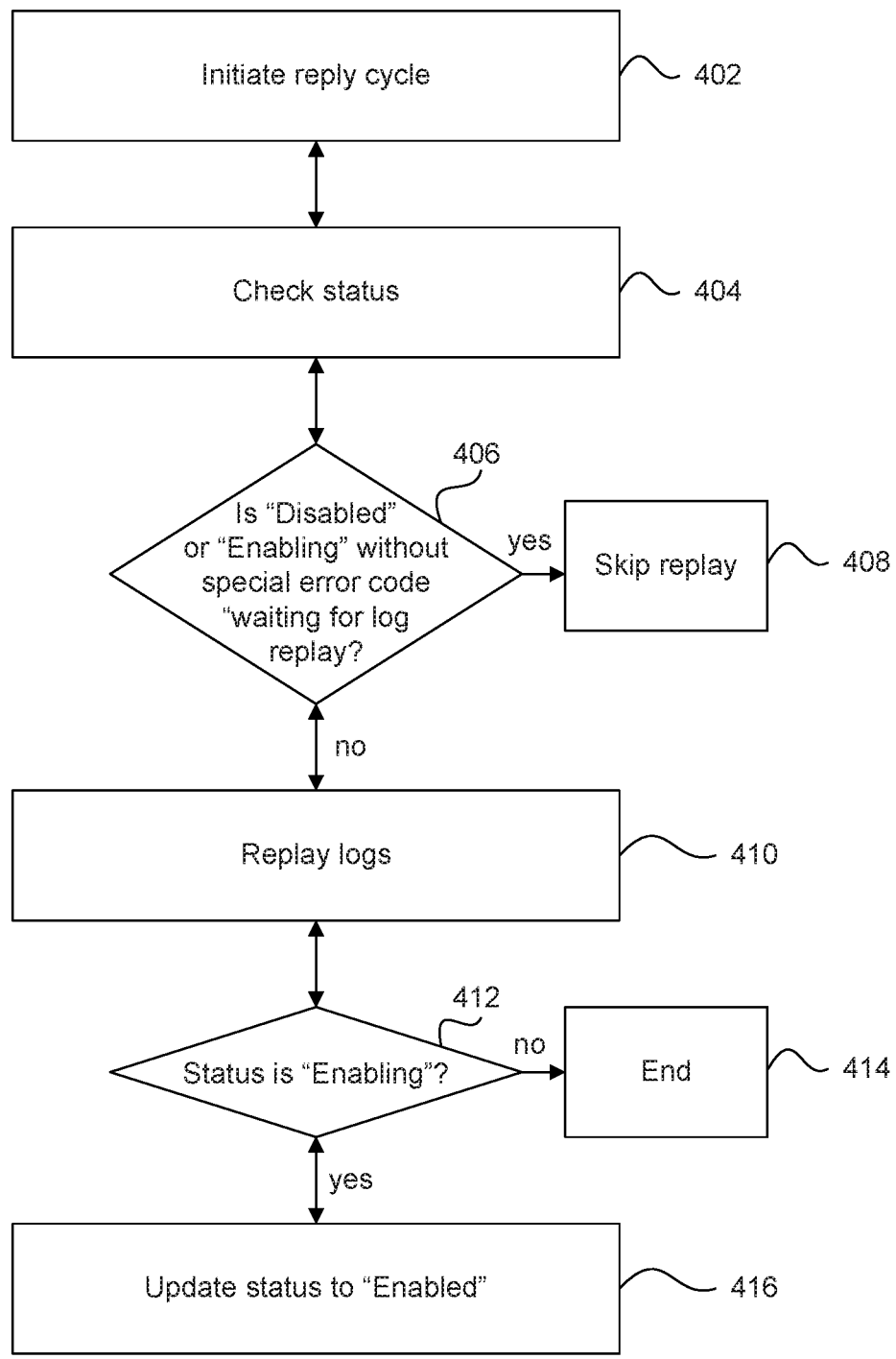
FIG. 4 is a flowchart illustrating a method of updating a replica table using a replayer, according to some embodiments.

FIG. 4 is a flowchart illustrating method 400 of updating a replica table using a replayer, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, replication manager 202 may initiate a replay cycle based on the configured replay period. For example, a replay cycle may occur every 60 seconds or other configurable time period. Replication manager 202 may engage replayer 204 to commence the replay cycle. Replayer 204 may determine one or more replication tables, such as replica table 132, to update based on replication configurations in replication manager 202.

In 404, replayer 204 may check the status replica table 132. Replayer 204 may retrieve the status from status monitor 208 via replication manager 202. In an embodiment, the status may be (1) "DISABLED"; (2) "ENABLING" with special error code="Waiting For Log Replay"; or (3) "ENABLED."

In 406, replayer 204 may determine if the status for replica table 132 is "DISABLED" or "ENABLING" without special error code "Waiting for log replay?" If the status is "ENABLED" or "ENABLING" with special error code "Waiting for log replay" then method 400 may proceed to 410. Otherwise, method 400 may proceed to 408.

In 408, replayer 204 may skip the replay cycle for that replica table. In this fashion, replayer 204 may only collect replica tables with a status of "ENABLED" or "ENABLING" with special error code "Waiting for log replay."

In 410, replayer 204 may replay the logs. Each time replayer 204 performs a replay, replayer 204 may retrieve the stored record commit timestamp indicating the transaction up to which replayer 204 had replayed. Replayer 204 may then retrieve transaction logs having a record commit timestamp that is greater than the saved record commit timestamp for replay. One skilled in the arts will appreciate that any write operation (e.g., insert/update) creates a new row ID for that row, with row ID being an ever-increasing number. Replayer 204 may be further optimized to select a maximum row ID based on records written by synchronizer 206, wherein the maximum row ID is selected to include only transactions committed after the transaction that introduced that row ID.

Replayer 204 may then identify a set of transactions to be processed from transaction logs in multi-tiered database 110. Replayer 204 may identify transitive interdependency based on tables updated in the transactions and deduce transitive closures, i.e., groups of transactions based on the updated tables. Multiple queues may exist to process the different transitive closures, with a particular transitive closure treated as a single internal transaction. Sets of tables within a given transitive closure may be replayed in parallel using sub transactions, with a commit happening once all transactions in the transitive closure are replayed. Replayer 204 may apply load balancing to the different queues. After replayer 204 performs the transactional replay, replayer may mark replica table 132 as "ENABLED" and clear the special code. As described above, replayer 204 setting the "ENABLED" flag avoids an inconsistent transactional state.

In 412, replayer 204 may determine if the status is "Enabling." If the status is not "ENABLING," i.e., the status is "ENABLED," then method 400 may proceed to 414 to end method 400. If the status is "ENABLING," then method 400 may proceed to 416. In 416, replayer 204 may change mark the status of replica table as "ENABLED."

Figure 5:
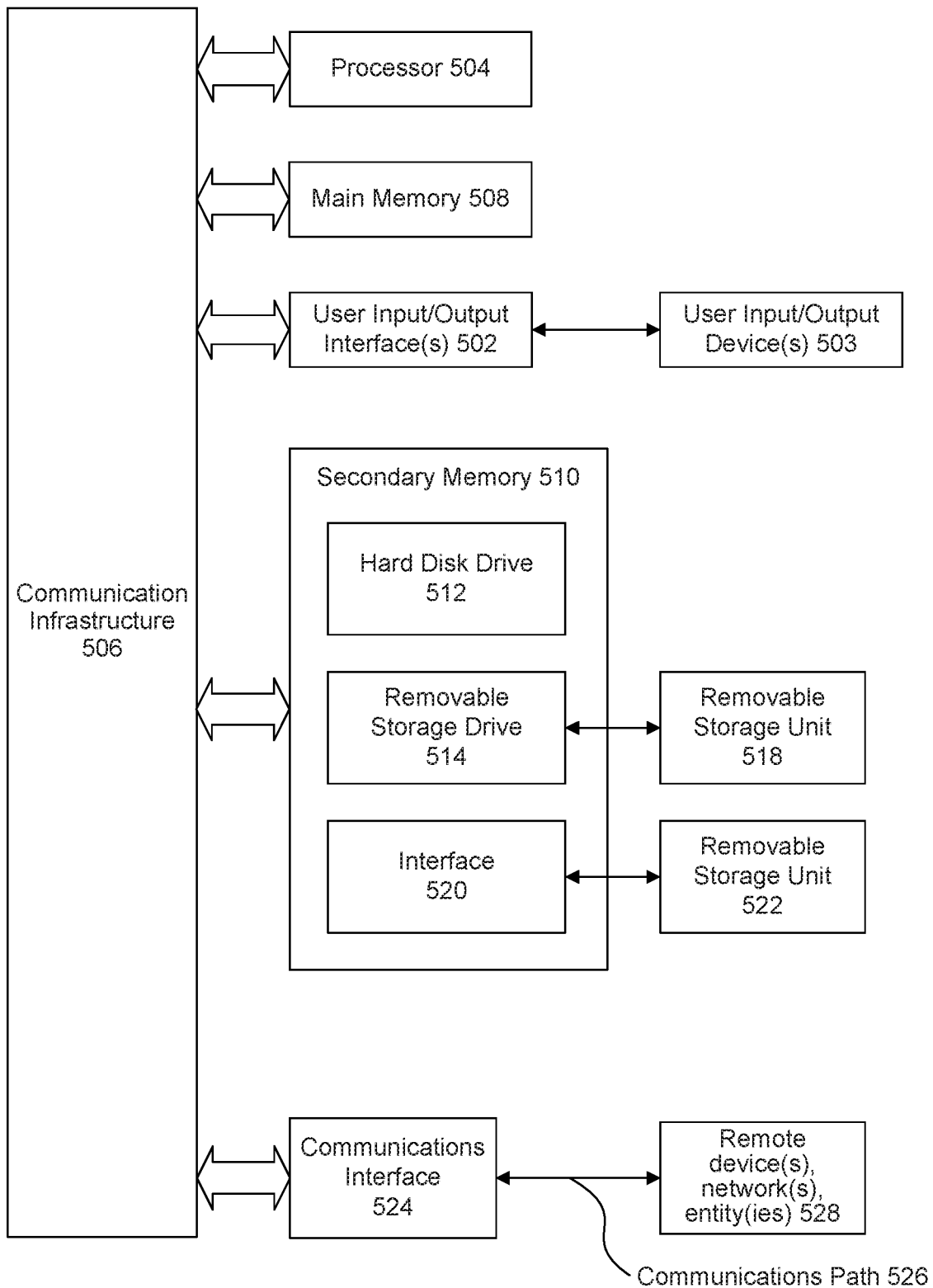
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   initiating, by one or more processors, a replay cycle for database replication against a replica table in a multi-tiered database, wherein the replica table corresponds to a source table in the multi-tiered database;
   retrieving, by the one or more processors, a replication status of the replica table;
   when the replication status indicates an enabled status or an enabling status with a special code for the replica table:
   retrieving, by the one or more processors, operations from a transaction log based on a last synchronization time, wherein the operations were performed on the source table, and wherein the operations were performed after the last synchronization time;
   performing, by the one or more processors, the operations against the replica table without locking the source table;
   updating, by the one or more processors, the replication status of the replica table to a disabled status and removing the special code if an error occurs after retrieving operations from the transaction log and before performing the operations against the replica table;
   updating, by the one or more processors, the replication status of the replica table from an enabling status with a special code to an enabled status and removing the special code after performing the operations and completing the replay cycle if the replication status is enabling status with a special code.

2. The method of claim 1, further comprising:
   determining, by the one or more processors, a second replica table and a second source table related to the replay cycle based on the transaction log;
   identifying, by the one or more processors, a transitive interdependency based on the source table and the second source table;
   grouping, by the one or more processors, the operations into transitive closures based on the transitive interdependency;
   performing, by the one or more processors, the operations in transactions based on the transitive closures, wherein the operations within a transitive closures are performed in parallel; and
   committing, by the one or more processors, the transactions when all the transactions are performed.

3. The method of claim 2, the committing further comprising:
   determining, by the one or more processors, an order in which to perform the transactions based on a commit queue.

4. The method of claim 1, further comprising:
   engaging, by the one or more processors, a synchronizer in response to a user command, wherein the synchronizer copies the source table into the replica table and sets the replication status for the replica table to the enabling status with the special code.

5. The method of claim 3, further comprising:
   aborting, by the one or more processors, the replay cycle when the replication status indicates a disabled status for the replica table.

6. The method of claim 1, further comprising:
   determining, by the one or more processors, a subset of the operations to skip when the last synchronization time is greater than a last replayed transaction commit timestamp.

7. The method of claim 1, further comprising:
   receiving a query wherein the query indicates an acceptable time period for which data in the replica table may be read;
   pulling the data from the replica table if the replica table data was refreshed within the acceptable time period; and
   pulling the data from the source table if the replica table data was last refreshed outside the acceptable time period.

8. A system, comprising:
   a memory; and
   at least one processor coupled to the memory and configured to:
   initiate a replay cycle for database replication against a replica table in a multi-tiered database, wherein the replica table corresponds to a source table in the multi-tiered database; and
   retrieve a replication status of the replica table;
   when the replication status indicates an enabled status or an enabling status with a special code for the replica table:
   retrieve operations from a transaction log based on a last synchronization time, wherein the operations were performed on the source table, and wherein the operations were performed after the last synchronization time;
   perform the operations against the replica table without locking the source table;
   update, by the one or more processors, the replication status of the replica table to a disabled status and removing the special code if an error occurs after retrieving operations from the transaction log and before performing the operations against the replica table;
   update, by the one or more processors, the replication status of the replica table from an enabling status with a special code to an enabled status and removing the special code after performing the operations and completing the replay cycle if the replication status is enabling status with a special code.

9. The system of claim 8, the at least one processor further configured to:
   determine a second replica table and a second source table related to the replay cycle based on the transaction log;
   identify a transitive interdependency based on the source table and the second source table;
   group the operations into transitive closures based on the transitive interdependency;
   perform the operations in transactions based on the transitive closures, wherein the operations within a transitive closures are performed in parallel; and
   commit the transactions when all the transactions are performed.

10. The system of claim 9, wherein to commit the at least one processor is further configured to:

determine an order in which to perform the transactions based on a commit queue.

11. The system of claim 8, the at least one processor further configured to:
engage a synchronizer in response to a user command, wherein the synchronizer copies the source table into the replica table and sets the replication status for the replica table to the enabling status with the special code.

12. The system of claim 8, the at least one processor further configured to:
abort the replay cycle when the replication status indicates a disabled status for the replica table.

13. The system of claim 8, the at least one processor further configured to:
determine a subset of the operations to skip when the last synchronization time is greater than a last replayed transaction commit timestamp.

14. The system of claim 8, wherein the at least one processor is further configured to:
receive a query wherein the query indicates an acceptable time period for which data in the replica table may be read;
pull the data from the replica table if the replica table data was refreshed within the acceptable time period; and
pull the data from the source table if the replica table data was last refreshed outside the acceptable time period.

15. A non-transitory computer-readable device having instructions stored thereon that, when executed by at least one computing device, cause the at least one computing device to perform instructions comprising:
initiating a replay cycle for database replication against a replica table in a multi-tiered database, wherein the replica table corresponds to a source table in the multi-tiered database;
retrieving a replication status of the replica table;
when the replication status indicates an enabled status or an enabling status with a special code for the replica table:
retrieving operations from a transaction log based on a last synchronization time, wherein the operations were performed on the source table, and wherein the operations were performed after the last synchronization time;
performing the operations against the replica table without locking the source table;
updating, by the one or more processors, the replication status of the replica table to a disabled status and removing the special code if an error occurs after retrieving operations from the transaction log and before performing the operations against the replica table;
updating, by the one or more processors, the replication status of the replica table from an enabling status with a special code to an enabled status and removing the special code after performing the operations and completing the replay cycle if the replication status is enabling status with a special code.

16. The non-transitory computer-readable device of claim 15, the instructions further comprising:
determining a second replica table and a second source table related to the replay cycle based on the transaction log;
identifying a transitive interdependency based on the source table and the second source table;
grouping the operations into transitive closures based on the transitive interdependency;
performing the operations in transactions based on the transitive closures, wherein the operations within a transitive closures are performed in parallel; and
committing the transactions when all the transactions are performed.

17. The non-transitory computer-readable device of claim 16, the committing comprising:
determining an order in which to perform the transactions based on a commit queue.

18. The non-transitory computer-readable device of claim 15, the instructions further comprising:
engaging a synchronizer in response to user command, wherein the synchronizer copies the source table into the replica table and sets the replication status for the replica table to the enabling status with the special code.

19. The non-transitory computer-readable device of claim 15, the instructions further comprising:
determining a subset of the operations to skip when the last synchronization time is greater than a last replayed transaction commit timestamp.

20. The non-transitory computer-readable device of claim 15, the instructions further comprising:
receiving a query wherein the query indicates an acceptable time period for which data in the replica table may be read;
pulling the data from the replica table if the replica table data was refreshed within the acceptable time period; and
pulling the data from the source table if the replica table data was last refreshed outside the acceptable time period.

* * * * *